United States Patent [19]
Mathis

[11] Patent Number: 4,577,924
[45] Date of Patent: Mar. 25, 1986

[54] OPTICAL RECURSIVE FILTER

[75] Inventor: Ronald F. Mathis, San Diego, Calif.

[73] Assignee: General Dynamics Electronics Division, San Diego, Calif.

[21] Appl. No.: 688,271

[22] Filed: Jan. 2, 1985

Related U.S. Application Data

[63] Continuation of Ser. No. 384,186, Jun. 3, 1982, abandoned.

[51] Int. Cl.[4] .......................... G02B 6/26; G02B 6/42
[52] U.S. Cl. .................................. 350/96.15
[58] Field of Search ............. 350/96.15, 96.20, 96.21, 350/96.16

[56] References Cited

U.S. PATENT DOCUMENTS 4,307,933  12/1981  Palmer et al. ................. 350/96.15

OTHER PUBLICATIONS

"Determination of Coupling Coefficients by Means of a Filter Resonator"; Marcuse; J. Opt. Soc. Am.; vol. 67, No. 8; Aug. 1977; pp. 997-1003.

Primary Examiner—William L. Sikes
Assistant Examiner—Robert E. Wise
Attorney, Agent, or Firm—Brown, Martin & Haller

[57] ABSTRACT

An optical RF bandpass filter employing a noncoherent optical carrier. The filter consists of a section of multi-mode optical fiber having a length equal to half the modulation wavelength with mirrors deposited at each end of the fiber. The fiber section functions as a resonant cavity for the intensity modulated light which is directed into the fiber and which exits at one end through one of the partially reflecting mirrors.

21 Claims, 9 Drawing Figures

OPTICAL RECURSIVE FILTER

This is a continuation of application Ser. No. 384,186 filed June 3, 1982, now abandoned.

FIELD OF THE INVENTION

This invention relates generally to RF filters and more particularly concerns a small, light-weight optical RF bandpass filter.

BACKGROUND OF THE INVENTION

Future tactical data links, electronic intelligence collection systems and high resolution radar receivers demand high performance, large time-bandwidth product devices for signal processing. Fiber and integrated optics technologies promise to provide versatile and effective signal processing techniques with bandwidths and time-bandwidth products exceeding those of any other technology currently envisioned. Other potential benefits include reduced size, weight, cost and complexity and reduced sensitivity to electromagnetic interference, electromagnetic pulse and nuclear radiation.

It is known to construct a segment of optical fiber which is resonant to the optical or carrier frequency by placing highly reflecting mirrors on both ends of the fiber and injecting light of appropriate characteristics into the fiber. A fiber segment so configured may be referred to as a resonant cavity with respect to the carrier frequency. This has been described as being useful for determination of coupling coefficients to enable one to specify and predict the light transmission characteristics of a particular fiber. This assumes the use of a multimode fiber segment where the coupling coefficients between at least two light propagating modes which are simultaneously at resonance within the fiber segment are measured.

It has not previously been suggested that a multimode optical fiber functioning as a resonant cavity may be employed, with its attendant advantages relating to cost, size, weight and reduced susceptibility to external interference, as an RF bandpass filter.

SUMMARY OF THE INVENTION

Broadly speaking, this invention concerns an optical recursive RF bandpass filter for signal processing applications requiring small, lightweight devices. This filter requires noncoherent or multimodal propagation, or both, of the light within the fiber segment resonator wherein the applied optical carrier is intensity modulated.

A multimode optical fiber segment having partially reflecting mirrors on each end functions as a resonant cavity with respect to the modulation frequency when the length of the fiber is equal to one half the modulation wavelength of the injected light in that fiber. In one embodiment modulated noncoherent light is injected into the fiber section by means of a directional coupler. Resonance occurs at the frequency of the modulation on the carrier and output is provided through the mirror at one end of the fiber segment. In another embodiment, the fiber element functions in the same manner but the modulated light is injected through a hole in the mirror on one end, preferably by means of a single mode fiber. The light so injected may be modulated coherent light but upon entry into the fiber resonant cavity, it is subject to multimodal propagation resulting in dispersion so that it functions in the manner of the filter described above.

By employing a multimode fiber and a noncoherent carrier, the device of this invention not only is much simpler and less expensive than optical resonant sensors which require a high-precision coherent light source with a single mode optical fiber, but it effectively functions as an RF bandpass filter.

BRIEF DESCRIPTION OF THE DRAWING

The objects, advantages and features of this invention will be more readily apparent from the following detailed description when read in conjunction with the accompanying drawing, in which.

DESCRIPTION OF THE PREFERRED EMBODIMENTS

Figure 1:
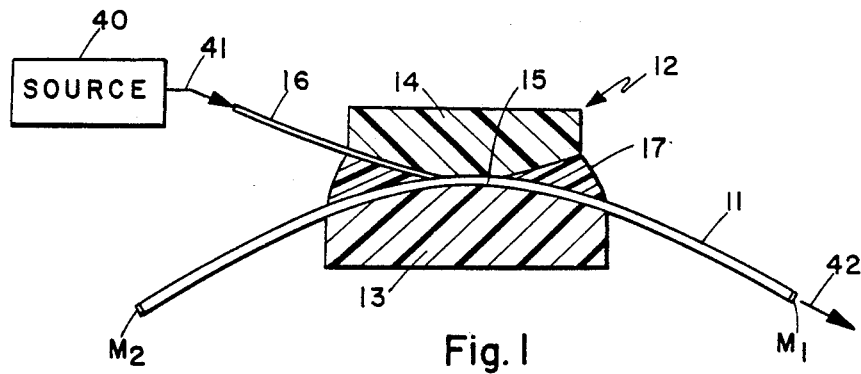
FIG. 1 is a somewhat schematic sectional view of one embodiment of a single bandpass filter in accordance with this invention.
Figure 2:
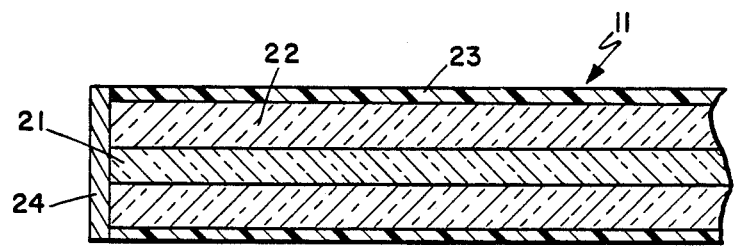
FIG. 2 is an enlarged partial sectional view of one end of the optical fiber of FIG. 1.

With reference now to the drawing, and more particularly to FIGS. 1 and 2 thereof, the physical structure of the optical RF bandpass filter of this invention is shown. Multimode optical fiber segment 11 is mounted in a directional coupler device 12 comprising coupler elements 13 and 14. Fiber 11 is formed over surface 15 of coupler element 13 and input fiber 16 is clamped in position with respect to fiber segment 11 by means of coupler element 14. This coupler structure and the fibers are held together by suitable means such as epoxy 17. FIG. 2 shows one end of fiber 11 comprised of core 21 surrounded by cladding 22 enclosed by buffer layer 23. Reflective coating or mirror 24 is applied by appropriate means such as deposition after the end of the fiber has been ground flat and polished.

By way of example, the fiber segment 11 may be a 200 $\mu$m core step index fiber having a buffer layer made of material capable of withstanding the requirements of deposition, that is, having heat-resistance characteristics up to 250° C. It has been found that when properly applied a buffer or jacket made of polytetrafluoroethylene (PTFE) is adequate. The buffer layer is necessary to protect the silica glass fiber from moisture and scratches which reduce the tensile strength of the fiber, thereby reducing its effective flexibility and causing it to break easily. The reflectance of the dielectric mirror is in the vicinity of 0.998 and the transmittance is in the vicinity of 0.001. In constructing the directional coupler, the cladding of the main fiber 11 is ground to within a very short distance of the core, for example, 2 $\mu$m, and the end of signal injection fiber 16 is applied to fiber segment 11 at that location. Of course, sizes, materials and specific parameters provided herein are examples only and the invention is not to be limited by these examples.

Figure 3A:
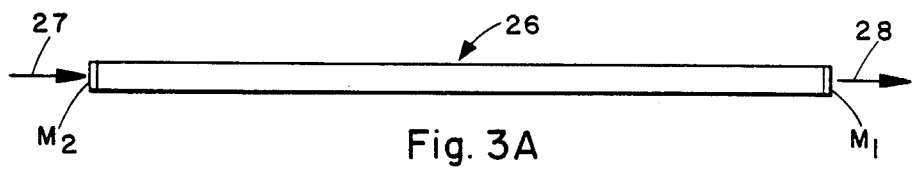
FIG. 3A is a schematic representation of an alternative embodiment of the invention.
Figure 3B:
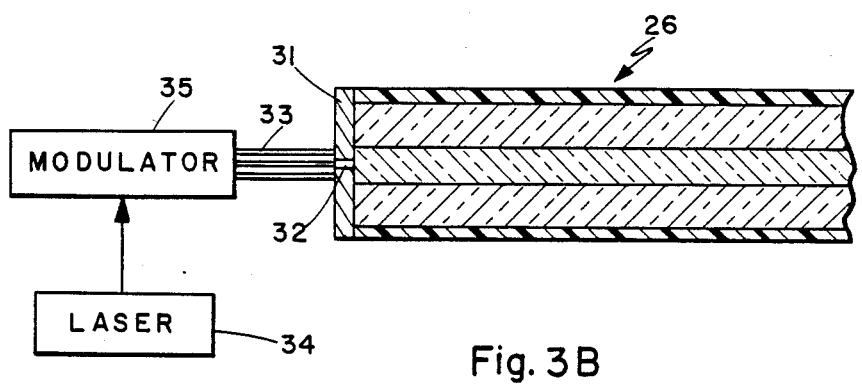
FIG. 3B is an enlarged partial schematic, partial sectional view of the embodiment of FIG. 3A.

An alternative embodiment of the invention is shown in FIG. 3. FIG. 3A is a schematic representation of a fiber segment 26 having input light represented by arrow 27 and an output represented by arrow 28. FIG. 3B is similar to FIG. 2 wherein fiber segment 26 is formed with an end mirror 31 having an axial hole 32 through it. The light is injected into fiber segment 26 by means of a single mode fiber 33 coupled to an appropriate light source such as laser 34, the output of which may be modulated by modulator 35. It should be noted that although the carrier light injected by means of fiber 33 might be coherent, upon passing through hole 32 in mirror 31 and entering multimode optical fiber 26, diffraction of the light will occur, resulting in multimodal propagation of the light in the fiber segment.

In both the embodiments described above, the fiber segment (11, 26) has a length L corresponding to half the wavelength $\lambda$ of the modulation frequency in that fiber. Light input 41 from source 40 applied to input fiber 16 enters fiber segment 11 through directional coupler 12 and exits through partially reflecting mirror $M_1$ as represented by arrow 42. By making the length of fiber 11 equal to half the modulation wavelength, it is clear that fiber segment 11 functions as a resonant cavity. It should be noted that it is not resonant to the optical carrier but to the modulation on the carrier. In FIG. 1 the light injected at 41 is noncoherent while the light injected at 27 in FIG. 3A is most likely coherent because of the size of injection fiber 33. However, because both fiber segments 11 and 26 are multimode optical fibers, both embodiments exhibit multimodal propagation of the light in the resonant cavity.

The 3-dB bandwidth, $\Delta f$, is given by $$\Delta f = \frac{f_c}{\pi \sqrt{A}} \left[ 1 - A + \tfrac{3}{8} A \left( \frac{\pi \Delta}{2 + \Delta} \right)^2 \right] \quad (1)$$

where $$\Delta = \tfrac{1}{2} \left[ 1 - \left( \frac{n_2}{n_1} \right)^2 \right]. \quad (2)$$

In the above equations,
$f_c$ is the center modulation frequency,
$A = R_1 R_2 (1 - l')$,
$R_1$ is the reflectance of mirror $M_1$,
$R_2$ is the reflectance of mirror $M_2$,
$l'$ represents the total losses in the cavity fiber,
$n_1$ is the refractive index of fiber core 21, and
$n_2$ is the refractive index of fiber cladding 22.

The signal insertion loss $l_t$ in dB is given by $$l_t = -20 \log \frac{\alpha \beta}{(1 - A \sin \omega_c \gamma / \omega_c \gamma)} \quad (3)$$

where
$\alpha$ is the fraction of light taken for the output ($\alpha \leq 1 - R_1$),
$\beta$ is the loss at the coupling input, frequently termed the launch coupler,
$\omega_c = 2\pi f_c$, and $$\gamma = \frac{\Delta}{(2 + \Delta) f_c}$$

Signal insertion loss values as small as 10 dB are possible, implying a 5 dB loss in the bias intensity.

Figure 4:
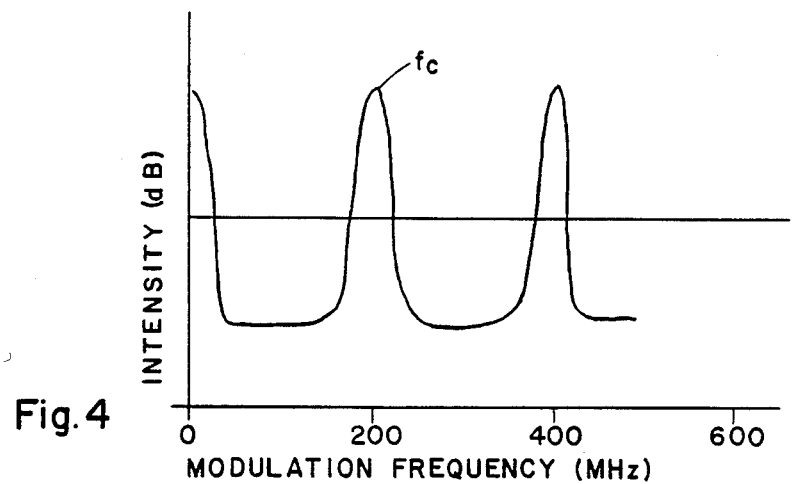
FIG. 4 is a plot of output intensity versus modulation frequency.

A filter constructed in accordance with the principles of this invention, specifically a filter employing a fiber segment 50 cm long, performs substantially as shown in the diagram of FIG. 4. The peak at 200 MHz is the fundamental center modulation frequency $f_c$. The other peaks shown are integer harmonics of the fundamental. It should be stressed again that the light input at 41 is intensity, that is, power modulated, not amplitude modulated. In this filter, it is expected that the 3-dB bandwidth of a few tenths of a percent ($\sim 0.5\%$) of the center frequency, resulting in a Q of about 200 where $Q = f / \Delta f$, can be achieved. The results shown in FIG. 4 are consistent with calculated values when $$L = \lambda / 2 = c / (2 n f_c) \quad (4)$$

where
L is the length of the fiber segment,
c is the speed of light ($3 \times 10^8$ m/sec), and
n is the effective refractive index and is taken as 1.5 in this example.

From equation (4) above it may be seen that L indeed equals 0.5 m or 50 cm.

Figure 5:
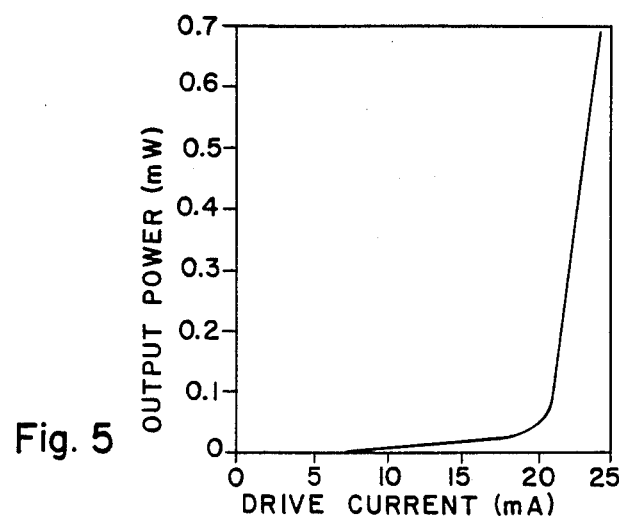
FIG. 5 is a graph of output power versus drive current for a typical laser diode which may be employed in this invention.
Figure 6:
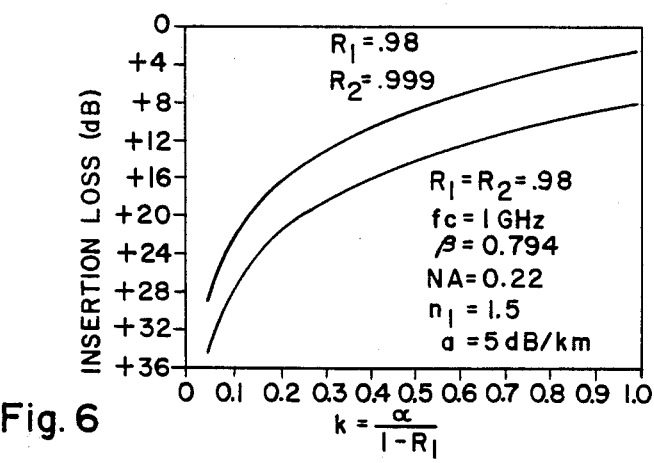
FIG. 6 is a graph of insertion loss with respect to a value which is a function of output and the reflectance of the output mirror.
Figure 7:
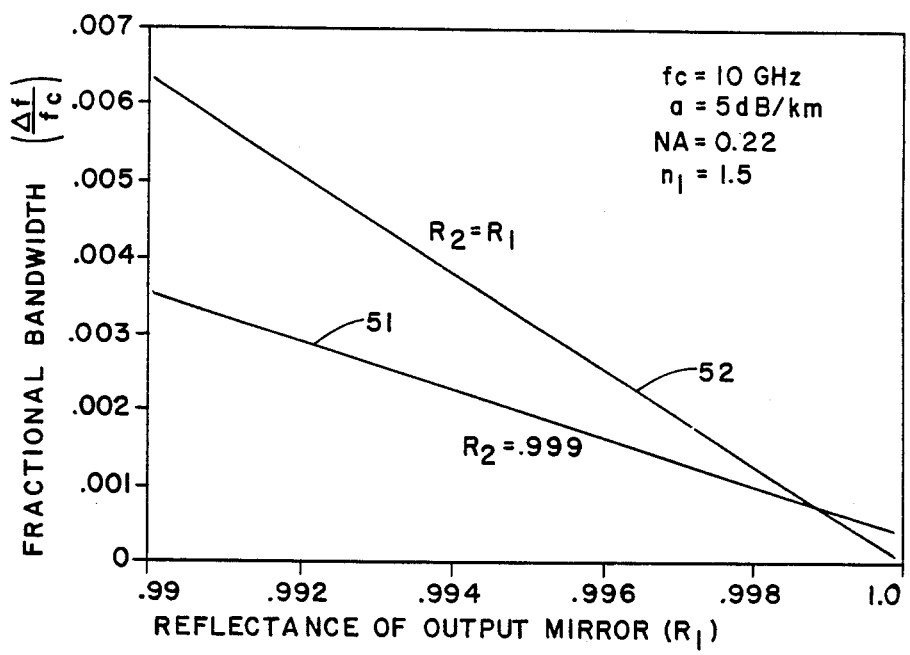
FIG. 7 is a graph of fractional bandwidth with respect to output mirror reflectance.
Figure 8:
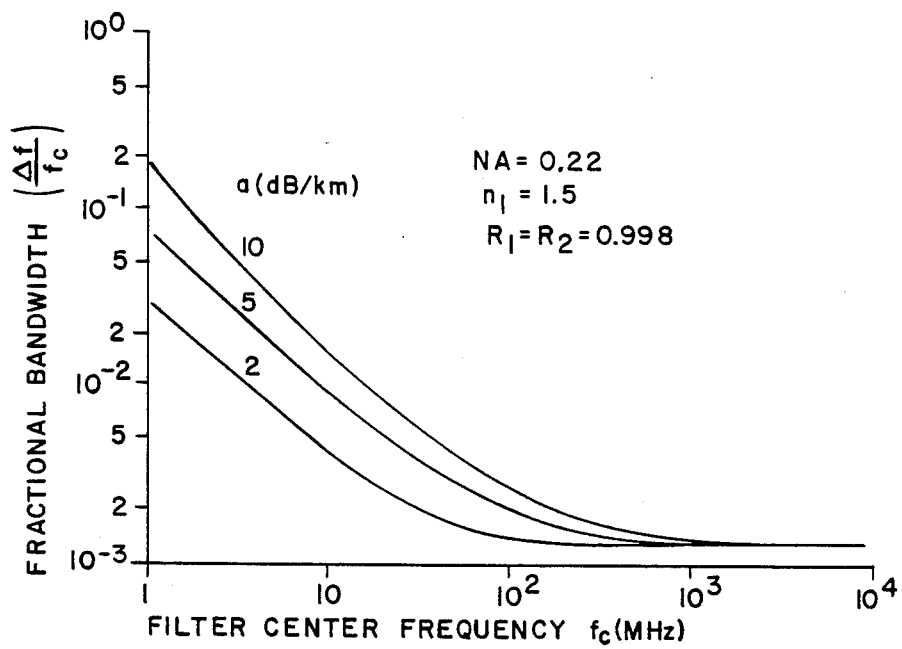
FIG. 8 is a graph of fractional bandwidth with respect to filter center frequency.

Filter performance as a function of key parameters for the RF bandpass filter of this invention is represented in the graphs of FIGS. 6–8. The laser diode, the light output from which is modulated prior to injection into the filter of FIG. 1 or 3, is a typical, readily available product, the power versus current curve being shown in FIG. 5. From this curve it may be seen that modulation about a DC bias level of approximately 23 mA (0.36 mW) with a modulating current of about 1 mA peak-to-peak is preferred. This also ensures that the intensity wave form has a bias level so that the intensity modulation always remains above zero intensity.

Insertion loss is represented in FIG. 6 for different relationships of the reflectances of mirrors $M_1$ and $M_2$. In this figure, insertion loss is given as a function of $k = \alpha / (1 - R_1)$. Ideally, it would be desirable to have $k = 1$ which implies that all of the energy which is not reflected by the mirror is collected at the output. In practice, of course, some of the light will be absorbed by the dielectric. A practical value for k with dielectric mirrors is in the range of 0.7 to 0.8 for $R_1 = 0.999$. Note from FIG. 6 that when $R_1 < < R_2$ the insertion loss is 6 dB less than when $R_1 = R_2$. In this case, while in absolute terms it appears to be a very small difference, 0.98 is indeed much less than 0.999. The other parameters which were held constant for this measurement are shown in the FIG. 6 graph. The modulation frequency is $f_c$, $\beta$ is the launch coupler loss, NA is the numerical aperture, $n_1$ is the effective refractive index of the fiber, and a is the characteristic fiber attenuation.

Fractional bandwidth as a function of reflectivity of the output mirror is shown in FIG. 7. Note that the bandwidth of the linear configuration filter is not explicitly dependent upon output fraction $\alpha$. Here again, in conformance with FIG. 6, the advantage of having the output mirror at a lower reflectivity than the opposite mirror ($R_1 < R_2$) is apparent. This is shown by the fact that curve 51 has a fractional bandwidth less than curve 52 for all values of $R_1$ less than $R_2$.

Fractional bandwidth as a function of filter center frequency, for different values (10, 5, 2) of characteristic fiber attenuation a, is shown in FIG. 8. Note that at approximately 1,000 MHz all of the fibers behave similarly with respect to fractional bandwidth. The degraded fractional bandwidths at the lower frequencies result from fiber transmission losses and dispersion. It can be seen from FIG. 8 that the functional bandwidth for a fiber having an attenuation of a=10 dB/km is substantially worse than where a=2 dB/km. This particular figure is plotted with reflectances $R_1=R_2=0.998$. The shapes of the curves are relatively similar for different values of reflectance but larger reflectances result in larger frequencies at which the effects of the fiber transmission losses and dispersion become important. This is consistent with the fact that larger reflectances result in larger effective pathlengths for the light in the fiber.

In comparing the present noncoherent filter with a coherent optical RF bandpass filter, that is, a filter which does not use a multimode optical fiber and employs coherent light, it has been found that the bandwidth of the coherent device with respect to the optical carrier frequency is very narrow and filter has extreme sensitivity to variations in fiber length. Thus such a filter operating with coherent light is very sensitive to small temperature changes in its center operating frequency $f_c$.

For purposes of analysis, comparison of this invention and a coherent filter employed in an RF spectrum analyzer is set forth. (1) For the coherent filter operation, a single mode laser must be used which is quite expensive relative to the laser which may be utilized for the noncoherent filter of the present invention. The coherent filter laser must be stable in frequency to one part in $10^6$, that is, one part per million, and as stated above, fiber length variations are critical to operating frequency. In the noncoherent filter of the present invention, fiber length variations which might be expected as a result of temperature changes do not significantly affect the operation of the device. (2) In the noncoherent RF filter, wide optical bandwidth operation is preferred while narrow bandwidth is necessary for the device operating with coherent light. (3) For a coherent filter, the modulator must have an output intensity proportional to the square of the signal amplitude. This is not a common or presently available device. In the non-coherent filter of the present invention, output intensity need only be linearly proportional to the signal amplitude and this is common operation for such a modulator. (4) An advantage of coherent operation is that a directional coupler is not required but, of course, precise control of fiber length caused by thermal and mechanical perturbations is critical. Because the noncoherent filter is concerned with the frequency and wavelength of the modulation as opposed to the carrier light, either the directional coupler of FIG. 1 or the axial coupler shown in FIG. 3 is necessary and this provides a limitation on the device. However, dynamic control of fiber length is not required. (5) In a spectrum analyzer employing the noncoherent filter of the present invention, an optical detector is required that is fast with respect to the RF carrier followed by an RF envelope detector. This is a disadvantage at very high frequencies with respect to coherent operation because that configuration only requires a detector that is fast with respect to the signal integration time. However, detector speed is not a problem for frequencies below approximately 10 GHz. (6) Finally, in the modulator/filter interface in coherent operation, because a single mode fiber is employed, there is a critical problem of alignment. In the non-coherent filter of the present invention, the wave guide/fiber interface is not as difficult because of the use of relatively larger multimode fibers.

In addition to use in RF spectrum analyzers, the noncoherent RF bandpass filter of this invention can advantageously be used in many other devices, among them being electronic intelligence receivers and fast frequency hopping modems. It is not necessary to provide comparison data for the invention employed in such devices.

What is claimed is:

1. An optical recursive RF bandpass filter for extracting light varying in intensity at a predetermined intensity modulation frequency from light varying in intensity over a band of intensity modulation frequencies, comprising:
    a segment of multimode optical fiber;
    a first mirror on one end of said fiber;
    a second mirror on the other end of said fiber; and
    means for directing light varying in intensity over a band of intensity modulation frequencies at a substantially constant optical wavelength into said fiber;
    wherein said fiber has a length equal to half the wavelength of a predetermined intensity modulation frequency in said band of intensity modulation frequencies in said fiber, said fiber with said first and second mirrors on opposite ends thereof defining a resonant cavity which permits resonance of light at said predetermined intensity modulation frequency, a portion of the resonating light within said resonant cavity exiting through one of said first and second mirrors as filtered output light varying in intensity at said predetermined intensity modulation frequency with said filtered output light being at said optical wavelength.

2. The filter recited in claim 1 wherein said first and second mirrors are formed of a dielectric material deposited on the respective fiber ends.

3. The filter recited in claim 1 wherein said light directing means comprises a directional coupler.

4. The filter recited in claim 3 wherein said directional coupler comprises a light injection fiber coupled to said multimode optical fiber.

5. The filter recited in claim 1 wherein said light directing means comprises an axial hole through one of said first and second mirrors and an injecting fiber axially aligned with and closely adjacent said hole.

6. The filter recited in claim 5 wherein said injecting fiber is a single mode fiber.

7. The filter recited in claim 1 wherein said optical fiber comprises a core and cladding of different refractive index.

8. The filter recited in claim 1 or 2 wherein the reflectance of the output mirror is less than the reflectance of the other mirror.

9. The filter recited in claim 1 or 2 wherein the reflectances of said mirrors are equal.

10. The filter recited in claim 1 wherein the length L of said filter is given by the relationship $$L=\lambda/2=c/(2nf_c)$$

where

λ is the wavelength of said predetermined intensity modulation frequency,
c is the speed of light,
n is the effective refractive index of said fiber, and
$f_c$ is the center modulation frequency.

11. The filter recited in claim 1 wherein the light directed into said resonant cavity exists as noncoherent light therein which resonates at said predetermined intensity modulation frequency.

12. The filter recited in claim 11 wherein the light directed into said resonant cavity is noncoherent.

13. The filter recited in claim 11 wherein the light directed into said resonant cavity is coherent.

14. The filter recited in claim 13 wherein the length of said fiber has a value other than one half the wavelength of the light directed into said fiber.

15. The filter of claim 11 wherein said filtered output light has a predetermined 3 dB intensity modulation frequency bandwidth about said predetermined intensity modulation frequency.

16. The filter recited in claim 1 wherein the length of said fiber has a value other than one half the wavelength of the light directed into said fiber.

17. A method for filtering light varying in intensity over a band of intensity modulation frequencies to provide light varying in intensity at a predetermined intensity modulation frequency, comprising the steps of:

providing a multimode optical fiber having a pair of mirrors each on a respective end of said fiber, said fiber having a length equal to half the wavelength of a predetermined intensity modulation frequency within a band of intensity modulation frequencies in said fiber, said fiber with said pair of mirrors defining a resonant cavity which permits resonance of light at said predetermined intensity modulation frequency, directing light varying in intensity over a band of intensity modulation frequencies at a substantially constant optical wavelength into said fiber, said light directed into said resonant cavity resonating at said predetermined intensity modulation frequency; and extracting a portion of the resonating light in said resonant cavity through one of said mirrors as filtered output light varying in intensity at said predetermined intensity modulation frequency with said filtered output light being at said optical wavelength.

18. The method recited in claim 17 wherein the light resonating in said resonant cavity exists as noncoherent light therein which resonates at said predetermined intensity modulation frequency.

19. The method recited in claim 18 wherein the light directed into said resonant cavity is noncoherent.

20. The method recited in claim 18 wherein the light directed into said resonant cavity is coherent.

21. The method recited in claim 18 wherein the length of said fiber has a value other than one half the wavelength of said light directed into the fiber.

* * * * *